United States Patent
Alsharif et al.

(10) Patent No.: US 11,853,450 B2
(45) Date of Patent: Dec. 26, 2023

(54) DETECTION OF WEB APPLICATION ANOMALIES USING MACHINE LEARNING

(71) Applicant: Saudi Arabian Oil Company, Dhahran (SA)

(72) Inventors: Sultan Saadaldean Alsharif, Al-Khobar (SA); Mohammed Ahmad Ababtain, Khobar (SA); Adrian Francis Goodhead, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 659 days.

(21) Appl. No.: 17/079,778

(22) Filed: Oct. 26, 2020

(65) Prior Publication Data

US 2021/0133346 A1 May 6, 2021

Related U.S. Application Data

(60) Provisional application No. 62/931,038, filed on Nov. 5, 2019.

(51) Int. Cl.
*G06F 21/62* (2013.01)
*G06F 16/906* (2019.01)
(Continued)

(52) U.S. Cl.
CPC ........ *G06F 21/6227* (2013.01); *G06F 16/906* (2019.01); *G06F 16/953* (2019.01); *G06F 16/986* (2019.01); *G06N 20/00* (2019.01)

(58) Field of Classification Search
CPC .... G06F 16/906; G06F 16/953; G06F 16/986; G06F 21/554; G06F 21/6227; G06N 20/00
See application file for complete search history.

(56) References Cited

U.S. PATENT DOCUMENTS

| 6,199,070 B1 | 3/2001 | Polo-Wood |
| 9,306,966 B2 * | 4/2016 | Eskin .................. H04L 63/1425 |

(Continued)

FOREIGN PATENT DOCUMENTS

| CN | 102780726 | 11/2012 |
| WO | WO 2020086860 | 4/2020 |

(Continued)

OTHER PUBLICATIONS

Li, "Automatic log analysis using machine learning: awesome automatic log analysis version," Uppsala Universitet, Jan. 2013, 42 pages.

(Continued)

*Primary Examiner* — Gary S Gracia
(74) *Attorney, Agent, or Firm* — Fish & Richardson P.C.

(57) ABSTRACT

Methods for detection of web application anomalies include receiving, by processors of a web server, web application logs and database logs. A machine learning algorithm is executed by the processors to segment the web application logs and the database logs into clusters based on probability density modeling, such that a variance of features within each cluster is less than a threshold variance. Each cluster corresponds to authorized access of backend databases or unauthorized access of the backend databases. The processors compare each cluster to baseline clusters corresponding to the authorized access of the backend databases. The processors determine that a particular cluster corresponds to the unauthorized access of the backend databases based on the comparison. Responsive to determining that the particular cluster corresponds to the unauthorized access of the backend databases, a display device of the web server generates a graphical user interface representing the particular cluster.

20 Claims, 4 Drawing Sheets

(51) Int. Cl.
*G06F 16/958* (2019.01)
*G06F 16/953* (2019.01)
*G06N 20/00* (2019.01)

(56) References Cited

U.S. PATENT DOCUMENTS

| | | | |
|---|---|---|---|
| 9,569,459 B1* | 2/2017 | Strauss | G06F 16/182 |
| 9,602,424 B1* | 3/2017 | Vincent | H04L 47/70 |
| 9,779,015 B1* | 10/2017 | Oikarinen | G06F 12/02 |
| 10,049,053 B1* | 8/2018 | Alshawabkeh | G06F 12/0871 |
| 10,462,170 B1* | 10/2019 | Wang | H04L 63/1416 |
| 10,713,143 B1* | 7/2020 | Vemulapati | G06F 9/5055 |
| 10,734,105 B1* | 8/2020 | Neumann | G06N 20/00 |
| 10,854,336 B1* | 12/2020 | Neumann | G06N 20/20 |
| 2007/0118534 A1 | 5/2007 | Hayes et al. | |
| 2009/0106769 A1 | 4/2009 | Nakamura | |
| 2014/0320126 A1* | 10/2014 | Heaton | G01V 11/00 324/303 |
| 2015/0277802 A1* | 10/2015 | Oikarinen | G06F 3/0689 711/114 |
| 2015/0277969 A1* | 10/2015 | Strauss | G06F 9/466 707/703 |
| 2015/0278243 A1* | 10/2015 | Vincent | G06F 16/182 707/634 |
| 2015/0278397 A1* | 10/2015 | Hendrickson | G06F 16/9024 707/798 |
| 2016/0224724 A1* | 8/2016 | Zhao | C12Q 1/6883 |
| 2016/0350610 A1* | 12/2016 | Yoo | G06T 7/73 |
| 2017/0012941 A1* | 1/2017 | Subbarayan | H04L 41/28 |
| 2017/0063905 A1* | 3/2017 | Muddu | G06N 7/01 |
| 2017/0104773 A1* | 4/2017 | Flacher | H04L 63/1458 |
| 2017/0220798 A1* | 8/2017 | Madou | G06F 21/552 |
| 2018/0174182 A1* | 6/2018 | Laufenberg | G06F 3/1243 |
| 2018/0234445 A1* | 8/2018 | Bhatt | H04L 63/1425 |
| 2019/0122130 A1* | 4/2019 | Basavarajappa | G06F 11/079 |
| 2019/0230021 A1* | 7/2019 | Shankar | H04L 41/142 |
| 2019/0260793 A1* | 8/2019 | Stockdale | G06F 21/554 |
| 2019/0266070 A1* | 8/2019 | Bhandarkar | G06F 11/3072 |
| 2020/0213325 A1* | 7/2020 | Scherman | H04L 63/1425 |
| 2020/0220875 A1* | 7/2020 | Harguindeguy | H04L 63/101 |
| 2020/0255301 A1* | 8/2020 | Budampati | C02F 1/42 |
| 2021/0104330 A1* | 4/2021 | Neumann | G16B 40/10 |
| 2021/0105613 A1* | 4/2021 | San Miguel | H04W 12/63 |
| 2021/0133346 A1* | 5/2021 | Alsharif | G06F 16/986 |
| 2021/0263733 A1* | 8/2021 | Tanniru | G06F 11/3452 |
| 2021/0397903 A1* | 12/2021 | Raj | G06Q 10/0635 |

FOREIGN PATENT DOCUMENTS

| | | |
|---|---|---|
| WO | WO 2020093036 | 5/2020 |
| WO | WO 2020094525 | 5/2020 |

OTHER PUBLICATIONS

PCT International Search Report and Written Opinion in International Appln. No. PCT/US2020/058853, dated Feb. 19, 2021, 16 pages.

* cited by examiner

Receive, by one or more processors of a web server, web application logs and database logs, the web server associated with an N-tier architecture
304

Segment, by a machine learning algorithm executed by the one or more processors, the web application logs and the database logs into a plurality of clusters based on probability density modeling, such that a variance of features within each cluster of the plurality of clusters is less than a threshold variance, each cluster of the plurality of clusters corresponding to one of authorized access of one or more backend databases or unauthorized access of the one or more backend databases
308

Compare, by the one or more processors, each cluster of the plurality of clusters to one or more baseline clusters corresponding to the authorized access of the one or more backend databases
312

Determine, by the one or more processors, that a particular cluster of the one or more clusters corresponds to the unauthorized access of the one or more backend databases based on the comparison
316

Responsive to determining that the particular cluster of the one or more clusters corresponds to the unauthorized access of the one or more backend databases, generate, by a display device of the web server, a graphical user interface representing the particular cluster
320

FIG. 3

FIG. 4

DETECTION OF WEB APPLICATION ANOMALIES USING MACHINE LEARNING

CROSS-REFERENCE TO RELATED APPLICATIONS

This application is a conversion of Provisional Application No. 62/931,038, filed on Nov. 5, 2019, and is hereby incorporated by reference in its entirety.

TECHNICAL FIELD

This description relates generally to cybersecurity, for example, to detection of web application anomalies using machine learning.

BACKGROUND

Internet cybersecurity poses increasing challenges as a result of the large amount of data generated by entities, such as routers, firewalls, operating systems, and web applications. Manual detection of malicious or fraudulent web requests can be insufficient because of the large amount of input data requiring investigation.

SUMMARY

Methods for detection of web application anomalies include receiving, by processors of a web server, web application logs and database logs. A machine learning algorithm is executed by the processors to segment the web application logs and the database logs into clusters based on probability density modeling, such that a variance of features within each cluster is less than a threshold variance. Each cluster corresponds to authorized access of backend databases or unauthorized access of the backend databases. The processors compare each cluster to baseline clusters corresponding to the authorized access of the backend databases. The processors determine that a particular cluster corresponds to the unauthorized access of the backend databases based on the comparison. Responsive to determining that the particular cluster corresponds to the unauthorized access of the backend databases, a display device of the web server generates a graphical user interface representing the particular cluster.

In some implementations, one or more processors receive stored web application activity and stored database activity. The machine learning algorithm generates the one or more baseline clusters. The generating of the one or more baseline clusters includes segmenting the stored web application activity and stored database activity based on the features.

In some implementations, the features include multiple parameterized Structured Query Language (SQL) database queries generated by a web application of the web server. The web application and the web server represents an application tier of the N-tier architecture. The multiple parameterized SQL database queries are generated based on data requested by one or more web requests from at least one of a client web browser or a web service.

In some implementations, the segmenting of the web application logs and the database logs into the multiple clusters includes determining, by the machine learning algorithm, a contextual correlation of the application logs to the database logs.

In some implementations, the one or more processors receive one or more web requests from at least one of a client web browser or a web service. The at least one of the client web browser or the web service represents a presentation tier of the N-tier architecture. The one or more processors transmit the one or more web requests to a web application executed by the one or more processors.

In some implementations, responsive to receiving the one or more web requests, the web application generates one or more parameterized SQL database queries and the web application logs. The one or more processors transmit the one or more parameterized SQL database queries to one or more backend databases representing a data tier of the N-tier architecture.

In some implementations, the one or more backend databases generate the database logs responsive to receiving the one or more parameterized SQL database queries.

DETAILED DESCRIPTION

The implementations disclosed provide methods, apparatus, and systems for detection of web application anomalies using machine learning. Web application anomalies refer to outlier behavior and deviations from normal web activity that are potential security events. The application security domain faces challenges related to the enormous volumes of data created by different sources, such as Internet routers, firewalls, and operating systems, as well as web applications. Security analysts often spend a vast amount of their time trying to identify requests that require further investigation from amongst the data received. The implementations disclosed address web applications that rely on backend databases to store and process information. The implementations develop actionable insights into web application activity from database logs as well as the web application logs. The implementations disclosed perform an analysis of logs created by a web application when a client web browser or web service connects to the application. The implementations enable the identification of web requests that are malicious amongst the many valid requests processed by the web application and the backend database.

Among other benefits and advantages, the methods provide a flexible and integrated framework for detection of web application anomalies using machine learning. The implementations disclosed reduce the generation of "false-positives" and "false-negatives," and decrease the administrative overhead. By clustering the web data, the implementations provide greater visibility of the underlying application activity to identify anomalous or malicious activity. Specifically, the implementations provide automated contextual correlation capabilities by leveraging unsupervised learning to identify threats to the confidentiality and integrity of the web applications being analyzed. The implementations result in a greater likelihood of preventing unauthorized access to the web applications being monitored.

Figure 1:
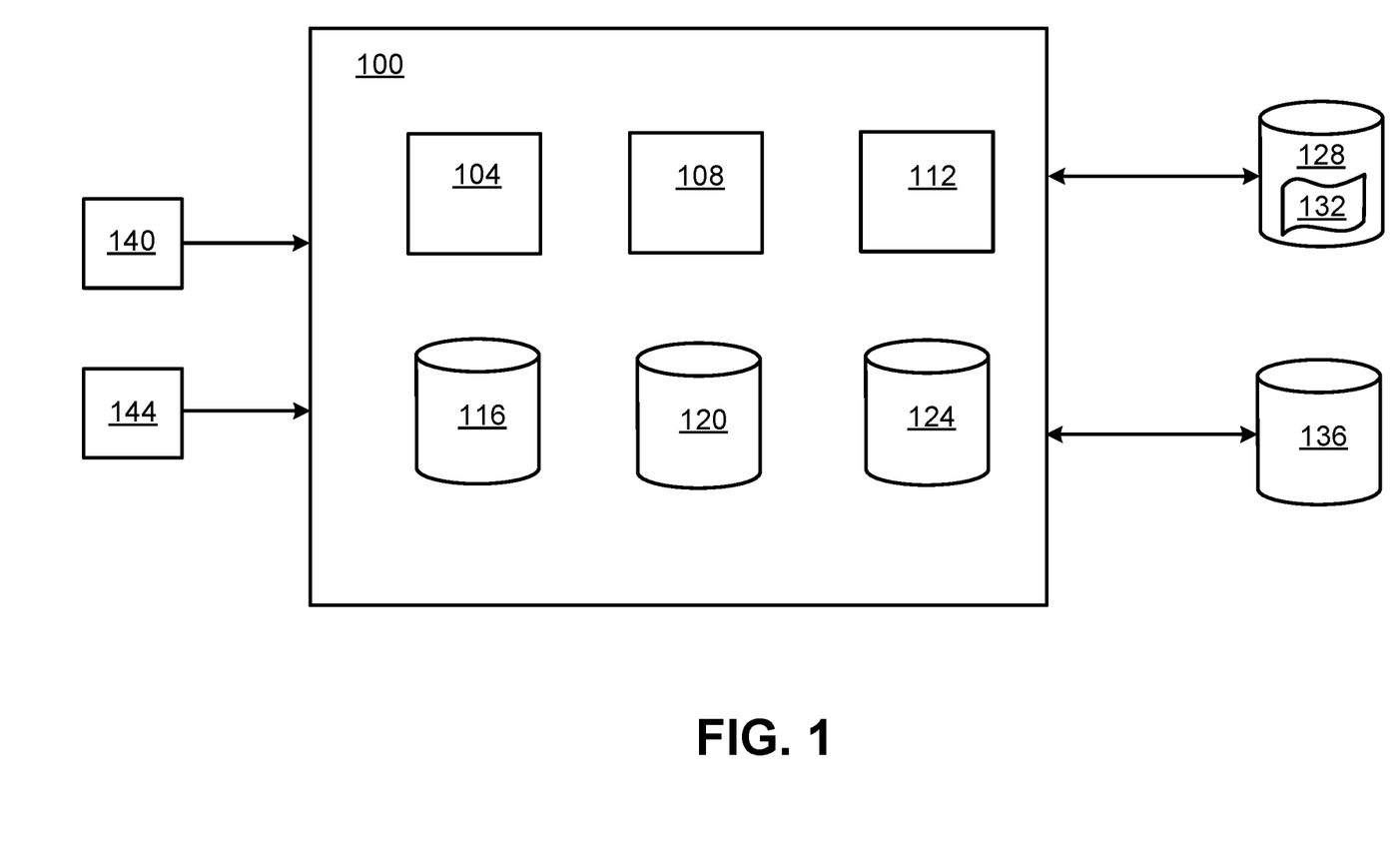
FIG. 1 illustrates an architecture for detection of web application anomalies using machine learning, in accordance with one or more implementations.

FIG. 1 illustrates an architecture for detection of web application anomalies using machine learning, in accordance with one or more implementations. The architecture includes a web server 100, a backend database 128, and an activity store 136. The architecture further includes a client web browser 140 and a web service 144. Each entity within the architecture illustrated in FIG. 1 can be implemented in hardware, software, firmware, or a combination thereof. For example, each entity can be an analog or digital circuit, a microprocessor, an application-specific integrated circuit, some other implementation, or a combination thereof as described and illustrated in more detail with reference to FIG. 4. The architecture illustrated in FIG. 1. represents an N-tier architecture. The web server 100 is associated with the N-tier architecture. An N-tier architecture is a client-server software architecture pattern in which the user interface (presentation tier), functional process logic (application tier), and computer data storage and data access (data tier) are developed and maintained as independent modules.

The web server 100 contains server software or hardware dedicated to running server software that responds to web requests from clients, such as the client web browser 140 or web service 144. The client web browser 140 and web service 144 represent the presentation tier of the N-tier architecture. A web request can be a request for data from a web page (for example, a web page stored on the web server 100 or the backend database 128) or a request to post data on a web page. The client web browser 140 is a software application for accessing information on the web, such as from the web server 100 or the backend database 128. When a user opens a particular website, the client web browser 140 retrieves the necessary content from the web server 100 and displays the resulting web page on a client device. The web service 144 can be a service offered by an electronic device to another electronic device, communicating with each other via the web. In some implementations, the web service 144 includes software running on a computer device that listens for requests and serves documents from the web server 100 or backend database 128, such as HyperText Markup Language (HTML), JavaScript Object Notification (JSON), Extensible Markup Language (XML), or images.

The web server 100 includes one or more processors 104, a machine learning algorithm 108, a web application 112, one more clusters 116 of data extracted from web application logs 124, and one or more baseline clusters 120. The web server 100 and the web application 112 represent an application tier of the N-tier architecture. The application tier is a logical tier pulled out from the presentation tier. As a separate layer, the application tier controls functionality of the web application 112 by processing the web requests. The web application 112 is a client-server computer program that the client (such as the client web browser 140 or web service 144) runs in the web browser 140. The web application can be webmail, online retail sales, online banking, online auction, or another type of web application.

The implementations disclosed identify anomalous or outlier web requests (web application anomalies) that are buried in the large volume of valid web requests being made to the web application 112. To identify the anomalous or outlier web requests, the one or more processors 104 receive stored web application activity and stored database activity 136. The processors 104 are implementations of the computer hardware processors 408 illustrated and described in more detail with reference to FIG. 4. The stored web application activity and stored database activity 136 represent historical valid requests that are used to create the baseline clusters 120.

The stored web application activity and stored database activity 136 includes data describing historical application logs, historical database logs, historical Structured Query Language (SQL) queries, and historical web requests. The historical application logs are generated by the web application 112 in response to the historical web requests from users, such as via the client web browser 140 or web service 144. The historical database logs are generated by the backend database 128 in response to historical SQL queries from the web server 100. The historical SQL queries are generated by the web application 112 in response to the historical web requests from users, such as via the client web browser 140 or web service 144.

SQL queries refer to domain-specific queries generated by the web application 112 for managing data held in a relational database management system (RDBMS), or for stream processing in a relational data stream management system (RDSMS), such as the backend database 128. The backend database 128 is a database that is accessed by the client web browser 140 or web service 144 via the web application 112, such as via SQL queries. The backend database 128 represents the data tier of the N-tier architecture. In some embodiments, the backend database 128 generates the database logs 132 responsive to receiving one or more parameterized SQL database queries from the web server 100. In other embodiments, the web application 112 generates an SQL query and then executes the SQL query to access the backend database 128. The backend database 128 generates the database logs 132 responsive to being accessed for data by the web server 100.

The machine learning algorithm 108 is trained using unsupervised learning based on the stored web application activity and stored database activity 136 to improve the likelihood of reducing "false-positives" and "false-negatives" when examining the web application logs 124 and database logs 132. The machine learning algorithm 108 is described in more detail with reference to FIG. 2. The machine learning algorithm 108 generates the one or more baseline clusters 120 by segmenting the stored web application activity and stored database activity 136 based on features extracted from the stored web application activity and stored database activity 136.

In some embodiments, the features include multiple parameterized SQL database queries extracted from the stored web application activity and stored database activity 136. The parameterized SQL database queries are generated by the web application 112 based on the data requested by the one or more web requests from the client web browser 140 or web service 144. For example, the parameters of the SQL queries depend on whether HTML documents are requested, the web requests are associated with JSON communication, XML documents are requested, or images are requested. HTML is a standard markup language for documents designed to be displayed in the web browser 140. JSON uses human-readable text to transmit data objects including attribute-value pairs and array data types. XML is a markup language that defines a set of rules for encoding documents in a format that is both human-readable and machine-readable. The images can be formatted in joint photographic experts group (JPEG), tagged image file format (TIFF), graphics interchange format (GIF), bitmapped (BMP), or other formats. The machine learning algorithm 108 is used to extract the parametrized SQL queries from the stored web application activity and stored database activity 136 to cluster the stored web application activity and stored database activity 136 into the one or more baseline clusters 120 that represent known, valid web requests. The clustering is illustrated and described in more detail with reference to FIG. 2.

Once the baseline clusters 120 are created, the web server 100 uses the baseline clusters 120 to identify new anomalous and outlier web requests. The web server 100 profiles the activity of the web application 112 and the backend databases that store the application data and database logs 132 using machine learning techniques. The one or more processors 104 receive one or more web requests from the client web browser 140 or web service 144. The one or more processors 104 transmit the one or more web requests to the web application 112 executed by the one or more processors 104. Responsive to receiving the one or more web requests, the web application 112 generates one or more parameterized SQL database queries and the web application logs 124. The one or more processors 104 transmit the one or more parameterized SQL database queries to the one or more backend databases 128 representing the data tier of the N-tier architecture.

The one or more backend databases 128 generate the database logs 132 in response to the one or more parameterized SQL database queries. The one or more processors 104 receive the web application logs 124 and database logs 132. The processors 104 perform an in-depth analysis of the backend database logs 132 and the frontend web application activities (the web application logs 124). The machine learning algorithm 108 is executed by the one or more processors 104. The web application logs 124 and the database logs 132 are segmented by the machine learning algorithm 108 into multiple clusters 116 based on probability density modeling as described and illustrated in more detail with reference to FIG. 2. For example, the machine learning algorithm 108 can compute a probability distribution or probability density function for different features. A probability density function represents a function whose value at a sample in the sample space is interpreted as a relative likelihood that the value of the feature equals the sample. The machine learning algorithm 108 performs the clustering of the web application logs 124 and database logs 132 such that a variance of features within each cluster of the multiple clusters 116 is less than a threshold variance. The variance refers to the expectation of the squared deviation of a feature from the mean value of the feature. For example, the machine learning algorithm 108 can parameterize a probability density function of a cluster in terms of the mean and the variance. Within each cluster, the variance of features is less than a threshold variance. The threshold variance can be set to the square of the standard deviation s of feature values within a cluster to minimize the variance. The threshold variance can be set to any value greater than the square of the standard deviation s (for example, $1.2 \times s^2$) based on computation time and feature values.

The segmenting of the web application logs 124 and the database logs 132 into the multiple clusters 116 includes determining, by the machine learning algorithm 108, a contextual correlation of the application logs 124 to the database logs 132. For example, the machine learning algorithm 108 can determine a contextual correlation between pairwise features that characterize data in the web application logs 124 and the database logs 132 from multiple views. Each cluster of the multiple clusters 116 corresponds to either authorized access of one or more backend databases 128 or unauthorized access of the one or more backend databases 128. The baseline clusters 120 correspond to the authorized access of the one or more backend databases 128.

The one or more processors 104 compare each cluster of the multiple clusters 116 to the one or more baseline clusters 120 corresponding to the authorized access of the one or more backend databases 128. An evaluation metric can be used to perform the comparison. In some embodiments, the machine learning algorithm 108 determines a similarity measure between a particular cluster and the one or more baseline clusters 120 by considering all pairs of samples and counting pairs that are assigned in the same or different clusters in the particular cluster and the one or more baseline clusters 120. Based on the comparison, the one or more processors 104 determine that a particular cluster of the one or more clusters 116 corresponds to the unauthorized access of the one or more backend databases 128.

Responsive to determining that a particular cluster corresponds to the unauthorized access of the one or more backend databases 128, the web server 100 generates a graphical user interface representing the particular cluster on a display device of the web server 100. For example, the display device can be the display device 424 of the computer system illustrated and described in more detail with reference to FIG. 4. The graphical representation can include text, pie charts, bar graphs, and numerical values to display the contextual correlation, patterns, and trends associated with the relationship between the database logs 132 and the web server requests that are created during unauthorized access attempts or security incidents.

Figure 2:
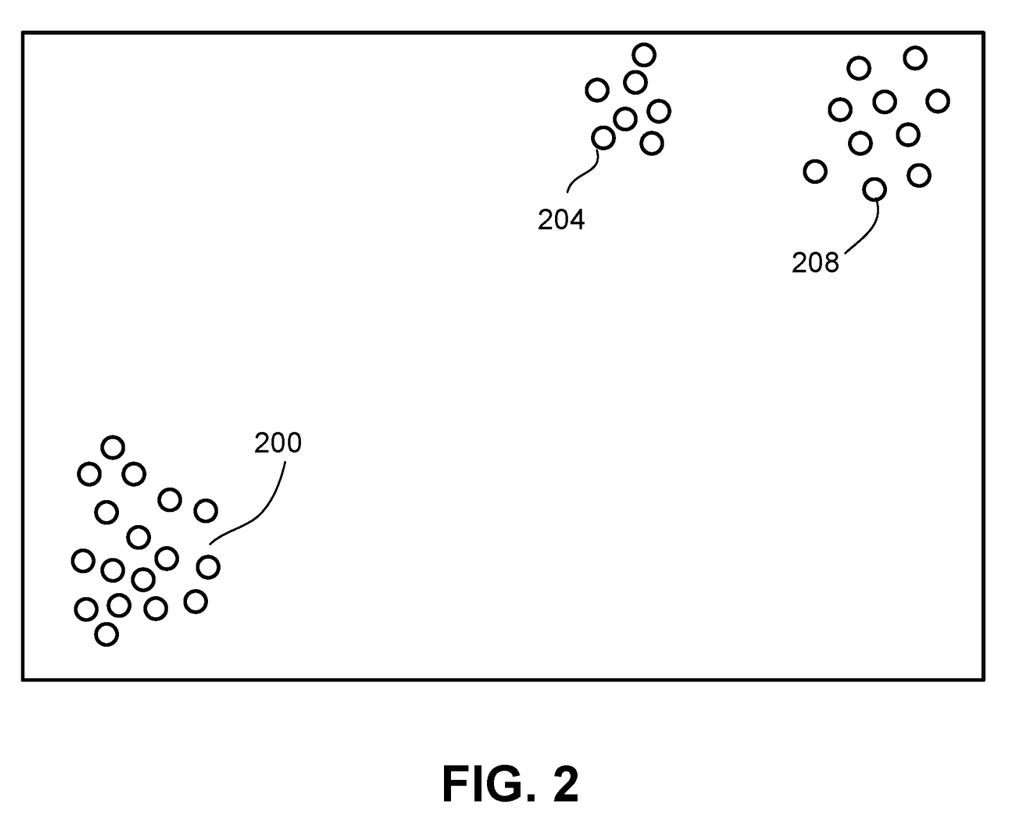
FIG. 2 illustrates example clustering of web security events, in accordance with one or more implementations.

FIG. 2 illustrates example clustering of web security events, in accordance with one or more implementations. The cluster 200 represents valid user events and known, good web requests. The cluster 200 corresponds to the baseline clusters 120 described and illustrated in more detail with reference to FIG. 1. The clusters 204, 208 represent potential security events (for example, web requests or parametrized SQL queries) associated with unauthorized access of the one or more backend databases 128. In some embodiments, K-means clustering is used to perform the clustering by the machine learning algorithm 108 to compare web requests being made to the frontend web application 112 to identify structural differences in the SQL database queries being generated by the web requests.

The machine learning algorithm 108 uses K-means clustering for data cluster analysis. The objective of the K-means clustering is to group similar data points (such as SQL queries or parameters of SQL queries) to discover underlying patterns. To achieve this objective, machine learning algorithm 108 scans for a fixed number (k) of clusters in the web application logs 124 and the database logs 132. Each cluster refers to a collection of data points aggregated together because of feature similarities. A target number, k, is defined that refers to the number of centroids in the dataset. A centroid is an imaginary or real location representing a center of a cluster (for example, cluster 204). Each data point is allocated to one of the clusters by reducing the in-cluster sum of squares. The machine learning algorithm 108 identifies the k centroids and then allocates each data point to a nearest cluster while keeping the centroids as small as possible.

To process the learning data (the stored web application activity and stored database activity 136), the machine learning algorithm 108 begins with a first group of randomly selected centroids that are used as the beginning points for each cluster. The machine learning algorithm 108 performs iterative (repetitive) calculations to optimize the positions of the centroids. The machine learning algorithm 108 creates an association between security events by averaging the likelihood of a log entry being security related (clusters 204, 208) or normal user activity (cluster 200).

Figure 3:
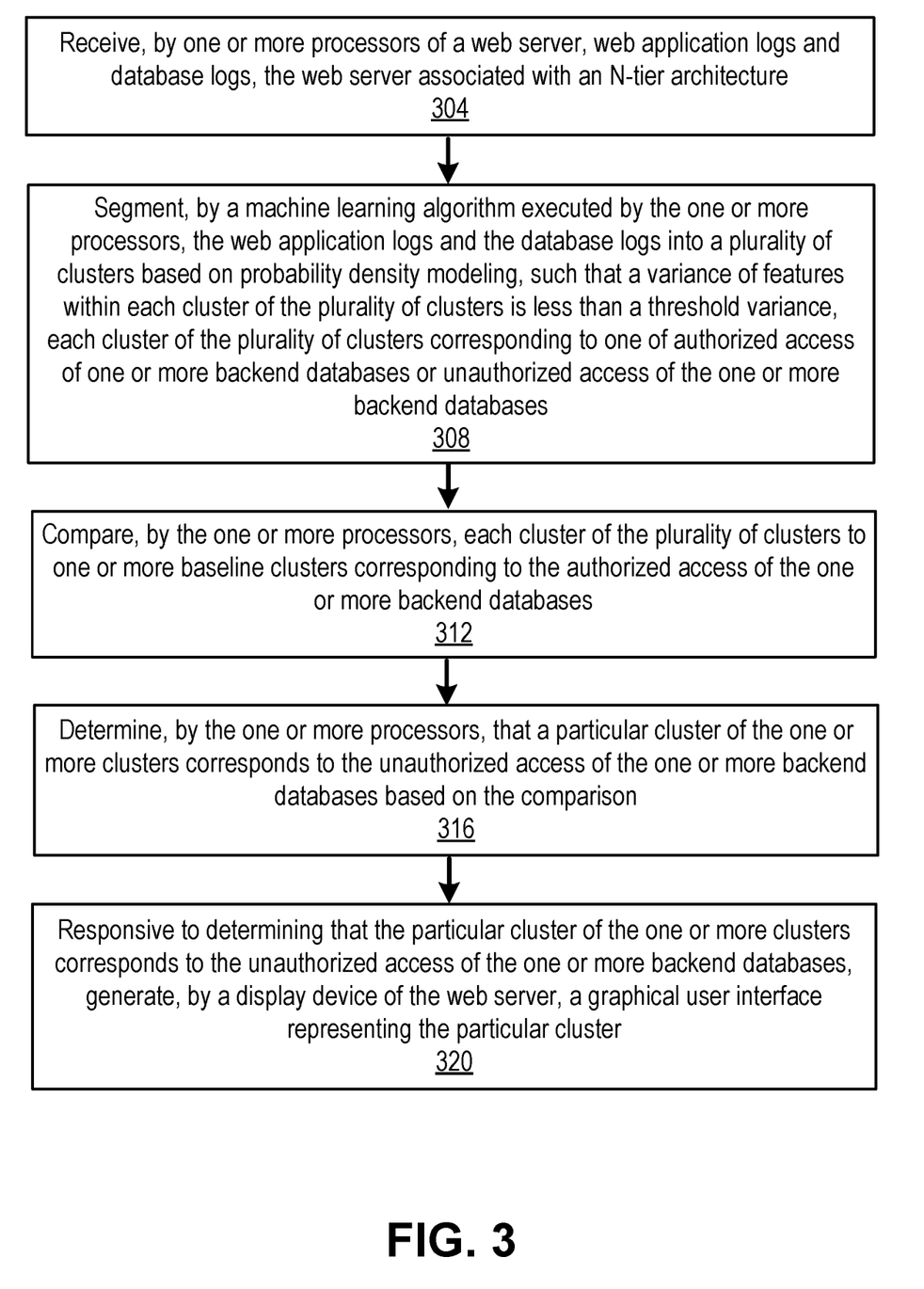
FIG. 3 illustrates a process for detection of web application anomalies using machine learning, in accordance with one or more implementations.

FIG. 3 illustrates a process for detection of web application anomalies using machine learning, in accordance with one or more implementations. In some implementations, the process is performed by the web server 100 or the computer system illustrated and described in more detail with reference to FIG. 4.

In step 304, one or more processors 104 of the web server 100 receive web application logs 124 and database logs 132. The web server 100 is associated with an N-tier architecture. A machine learning algorithm 108 is trained using unsupervised learning based on stored web application activity and stored database activity 136 to improve the likelihood of reducing "false-positives" and "false-negatives" when examining the web application logs 124 and database logs 132.

In step 308, a machine learning algorithm 108 executed by the one or more processors 104 segments the web application logs 124 and the database logs 132 into multiple clusters based on probability density modeling. A variance of features within each cluster of the multiple clusters is less than a threshold variance. Each cluster of the multiple clusters corresponds to one of authorized access of one or more backend databases 128 or unauthorized access of the one or more backend databases 128.

In step 312, the one or more processors 104 compare each cluster of the multiple clusters to one or more baseline clusters 120. The one or more baseline clusters 120 correspond to the authorized access of the one or more backend databases 128. An evaluation metric can be used to perform the comparison.

In step 316, the one or more processors 104 determine that a particular cluster of the one or more clusters corresponds to the unauthorized access of the one or more backend databases 128 based on the comparison. In some embodiments, the machine learning algorithm 108 determines a similarity measure between a particular cluster and the one or more baseline clusters 120 by considering all pairs of samples and counting pairs that are assigned in the same or different clusters in the particular cluster and the one or more baseline clusters 120.

In step 320, responsive to determining that the particular cluster of the one or more clusters corresponds to the unauthorized access of the one or more backend databases 128, a display device of the web server 100 generates a graphical user interface representing the particular cluster. For example, the display device can be the display device 424 of the computer system illustrated and described in more detail with reference to FIG. 4. The graphical representation can include text, pie charts, bar graphs, and numerical values to display the contextual correlation, patterns, and trends associated with the relationship between the database logs 132 and the web server requests that are created during unauthorized access attempts or security incidents.

Figure 4:
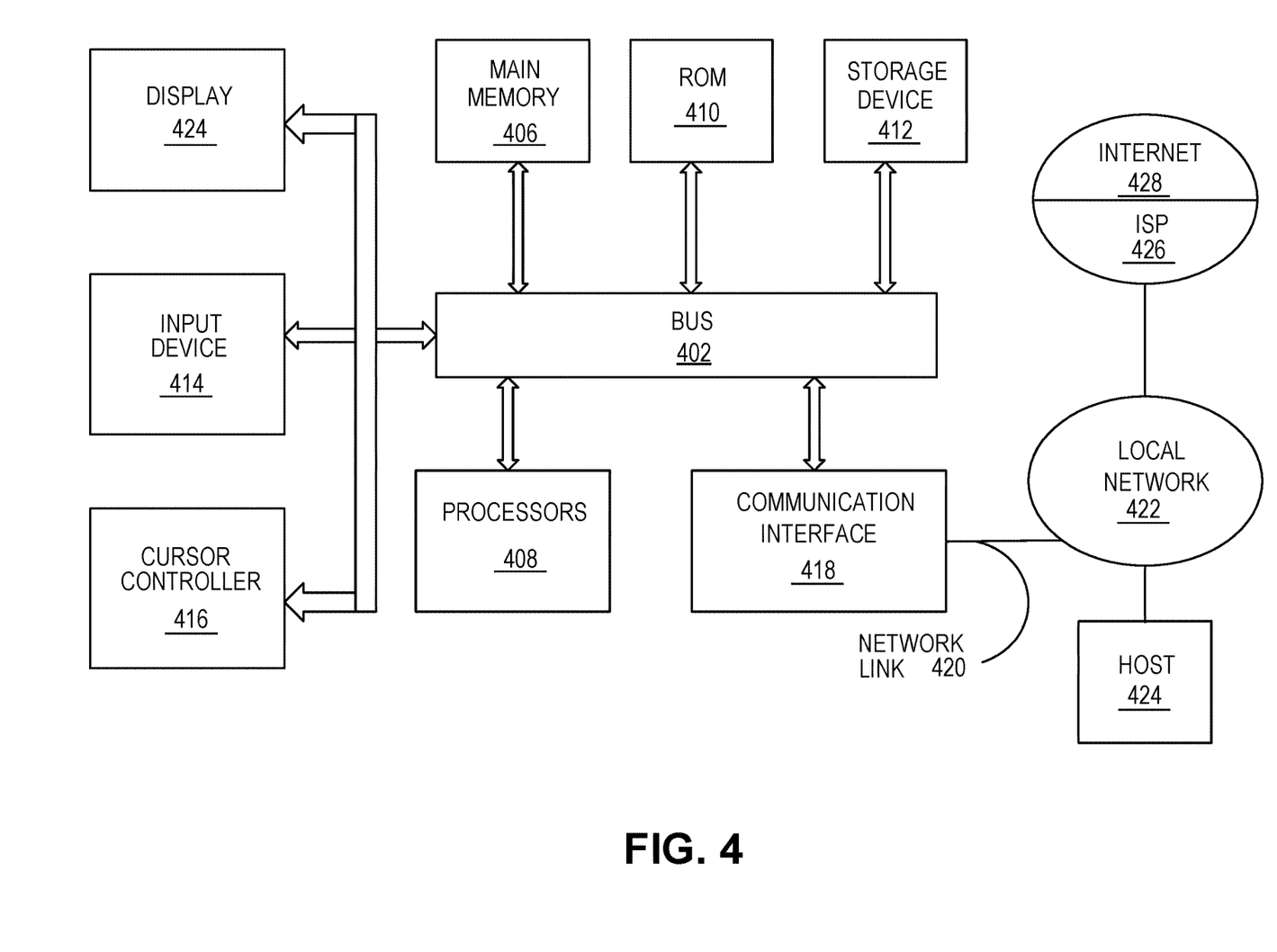
FIG. 4 illustrates an example machine, in accordance with one or more implementations.

FIG. 4 illustrates an example machine, in accordance with one or more implementations. In the example implementation, the computer system is a special purpose computing device. The special-purpose computing device is hard-wired or includes digital electronic devices such as one or more application-specific integrated circuits (ASICs) or field programmable gate arrays (FPGAs) that are persistently programmed to perform the techniques herein, or can include one or more general purpose hardware processors programmed to perform the techniques pursuant to program instructions in firmware, memory, other storage, or a combination. Such special-purpose computing devices can also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system includes a bus 402 or other communication mechanism for communicating information, and one or more computer hardware processors 408 coupled with the bus 402 for processing information. The hardware processors 408 are, for example, general-purpose microprocessors. The computer system also includes a main memory 406, such as a random-access memory (RAM) or other dynamic storage device, coupled to the bus 402 for storing information and instructions to be executed by processors 408. In one implementation, the main memory 406 is used for storing temporary variables or other intermediate information during execution of instructions to be executed by the processors 408. Such instructions, when stored in non-transitory storage media accessible to the processors 408, render the computer system into a special-purpose machine that is customized to perform the operations specified in the instructions.

In an embodiment, the computer system further includes a read only memory (ROM) 410 or other static storage device coupled to the bus 402 for storing static information and instructions for the processors 408. A storage device 412, such as a magnetic disk, optical disk, solid-state drive, or three-dimensional cross point memory is provided and coupled to the bus 402 for storing information and instructions.

In an embodiment, the computer system is coupled via the bus 402 to a display 424, such as a cathode ray tube (CRT), a liquid crystal display (LCD), plasma display, light emitting diode (LED) display, or an organic light emitting diode (OLED) display for displaying information to a computer user. An input device 414, including alphanumeric and other keys, is coupled to bus 402 for communicating information and command selections to the processors 408. Another type of user input device is a cursor controller 416, such as a mouse, a trackball, a touch-enabled display, or cursor direction keys for communicating direction information and command selections to the processors 408 and for controlling cursor movement on the display 424. This input device typically has two degrees of freedom in two axes, a first axis (e.g., x-axis) and a second axis (e.g., y-axis), that allows the device to specify positions in a plane.

According to one embodiment, the techniques herein are performed by the computer system in response to the processors 408 executing one or more sequences of one or more instructions contained in the main memory 406. Such instructions are read into the main memory 406 from another storage medium, such as the storage device 412. Execution of the sequences of instructions contained in the main memory 406 causes the processors 408 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 412.

Volatile media includes dynamic memory, such as the main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but can be used in conjunction with transmission media. Transmission media participates in transferring information between storage media. For example, transmission media includes coaxial cables, copper wire and fiber optics, including the wires that include the bus 402. Transmission media can also take the form of acoustic or light waves, such as those generated during radio-wave and infrared data communications.

In an embodiment, various forms of media are involved in carrying one or more sequences of one or more instructions to the processors 408 for execution. For example, the instructions are initially carried on a magnetic disk or solid-state drive of a remote computer. The remote computer loads the instructions into its dynamic memory and send the instructions over a telephone line using a modem. A modem local to the computer system receives the data on the telephone line and use an infrared transmitter to convert the data to an infrared signal. An infrared detector receives the data carried in the infrared signal and appropriate circuitry places the data on the bus 402. The bus 402 carries the data to the main memory 406, from which processors 408 retrieves and executes the instructions. The instructions received by the main memory 406 can optionally be stored on the storage device 412 either before or after execution by processors 408.

The computer system also includes a communication interface 418 coupled to the bus 402. The communication interface 418 provides a two-way data communication coupling to a network link 420 that is connected to a local network 422. For example, the communication interface 418 is an integrated service digital network (ISDN) card, cable modem, satellite modem, or a modem to provide a data communication connection to a corresponding type of telephone line. As another example, the communication interface 418 is a local area network (LAN) card to provide a data communication connection to a compatible LAN. In some implementations, wireless links are also implemented. In any such implementation, the communication interface 418 sends and receives electrical, electromagnetic, or optical signals that carry digital data streams representing various types of information.

The network link 420 typically provides data communication through one or more networks to other data devices. For example, the network link 420 provides a connection through the local network 422 to a host computer 424 or to a cloud data center or equipment operated by an Internet Service Provider (ISP) 426. The ISP 426 in turn provides data communication services through the world-wide packet data communication network now commonly referred to as the "Internet" 428. The local network 422 and Internet 428 both use electrical, electromagnetic or optical signals that carry digital data streams. The signals through the various networks and the signals on the network link 420 and through the communication interface 418, which carry the digital data to and from the computer system, are example forms of transmission media.

The computer system sends messages and receives data, including program code, through the network(s), the network link 420, and the communication interface 418. In an embodiment, the computer system receives code for processing. The received code is executed by the processors 408 as it is received, and/or stored in storage device 412, or other non-volatile storage for later execution.

What is claimed is:

1. A method comprising:
   receiving, by one or more processors of a web server, web application logs and database logs, the web server associated with an N-tier architecture;
   segmenting, by a machine learning algorithm executed by the one or more processors, the web application logs and the database logs into a plurality of clusters based on probability density modeling, such that a variance of features within each cluster of the plurality of clusters is less than a threshold variance, each cluster of the plurality of clusters corresponding to one of authorized access of one or more backend databases or unauthorized access of the one or more backend databases;
   comparing, by the one or more processors, each cluster of the plurality of clusters to one or more baseline clusters corresponding to the authorized access of the one or more backend databases;
   determining, by the one or more processors, that a particular cluster of the one or more clusters corresponds to the unauthorized access of the one or more backend databases based on the comparison; and
   responsive to determining that the particular cluster of the one or more clusters corresponds to the unauthorized access of the one or more backend databases, generating, by a display device of the web server, a graphical user interface representing the particular cluster.

2. The method of claim 1, further comprising:
   receiving, by the one or more processors, stored web application activity and stored database activity; and
   generating, by the machine learning algorithm, the one or more baseline clusters, the generating of the one or more baseline clusters comprising segmenting the stored web application activity and stored database activity based on the features.

3. The method of claim 1, wherein the features comprise a plurality of parameterized Structured Query Language (SQL) database queries generated by a web application of the web server, the web application and the web server representing an application tier of the N-tier architecture, the plurality of parameterized SQL database queries generated based on data requested by one or more web requests from at least one of a client web browser or a web service.

4. The method of claim 1, wherein the segmenting of the web application logs and the database logs into the plurality of clusters comprises determining, by the machine learning algorithm, a contextual correlation of the application logs to the database logs.

5. The method of claim 1, further comprising:
   receiving, by the one or more processors, one or more web requests from at least one of a client web browser or a web service, the at least one of the client web browser or the web service representing a presentation tier of the N-tier architecture; and
   transmitting, by the one or more processors, the one or more web requests to a web application executed by the one or more processors.

6. The method of claim 5, further comprising:
   responsive to receiving the one or more web requests, generating, by the web application, one or more parameterized SQL database queries and the web application logs; and transmitting, by the one or more processors, the one or more parameterized SQL database queries to one or more backend databases representing a data tier of the N-tier architecture.

7. The method of claim 6, further comprising generating, by the one or more backend databases, the database logs responsive to receiving the one or more parameterized SQL database queries.

8. A non-transitory computer-readable storage medium storing instructions executable by one or more computer processors of a web server, the instructions when executed by the one or more computer processors cause the one or more computer processors to:
   receive web application logs and database logs, the web server associated with an N-tier architecture;
   segment, by a machine learning algorithm executed by the one or more processors, the web application logs and the database logs into a plurality of clusters based on probability density modeling, such that a variance of features within each cluster of the plurality of clusters is less than a threshold variance, each cluster of the plurality of clusters corresponding to one of authorized access of one or more backend databases or unauthorized access of the one or more backend databases;
   compare each cluster of the plurality of clusters to one or more baseline clusters corresponding to the authorized access of the one or more backend databases;
   determine that a particular cluster of the one or more clusters corresponds to the unauthorized access of the one or more backend databases based on the comparison; and
   responsive to determining that the particular cluster of the one or more clusters corresponds to the unauthorized access of the one or more backend databases, generate, by a display device of the web server, a graphical user interface representing the particular cluster.

9. The non-transitory computer-readable storage medium of claim 8, wherein the instructions further cause the one or more computer processors to:
   receive stored web application activity and stored database activity; and
   generate, by the machine learning algorithm, the one or more baseline clusters, the generating of the one or more baseline clusters comprising segmenting the stored web application activity and stored database activity based on the features.

10. The non-transitory computer-readable storage medium of claim 8, wherein the features comprise a plurality of parameterized SQL database queries generated by the web server, the web application and the web server representing an application tier of the N-tier architecture, the plurality of parameterized SQL database queries generated based on data requested by one or more web requests from at least one of a client web browser or a web service.

11. The non-transitory computer-readable storage medium of claim 8, wherein the segmenting of the web application logs and the database logs into the plurality of clusters comprises determining, by the machine learning algorithm, a contextual correlation of the application logs to the database logs.

12. The non-transitory computer-readable storage medium of claim 8, wherein the instructions further cause the one or more computer processors to:
   receive one or more web requests from at least one of a client web browser or a web service, the at least one of the client web browser or the web service representing a presentation tier of the N-tier architecture; and
   transmit the one or more web requests to a web application executed by the one or more processors.

13. The non-transitory computer-readable storage medium of claim 12, wherein the instructions further cause the one or more computer processors to:
   responsive to receiving the one or more web requests, generate, by the web application, one or more parameterized SQL database queries and the web application logs; and
   transmit the one or more parameterized SQL database queries to one or more backend databases representing a data tier of the N-tier architecture.

14. The non-transitory computer-readable storage medium of claim 13, wherein the instructions further cause the one or more computer processors to:
   generate, by the one or more backend databases, the database logs responsive to receiving the one or more parameterized SQL database queries.

15. A web server comprising:
   one or more computer processors; and
   a non-transitory computer-readable storage medium storing instructions executable by the one or more computer processors, the instructions when executed by the one or more computer processors cause the one or more computer processors to:
   receive web application logs and database logs, the web server associated with an N-tier architecture;
   segment, by a machine learning algorithm executed by the one or more processors, the web application logs and the database logs into a plurality of clusters based on probability density modeling, such that a variance of features within each cluster of the plurality of clusters is less than a threshold variance, each cluster of the plurality of clusters corresponding to one of authorized access of one or more backend databases or unauthorized access of the one or more backend databases;
   compare each cluster of the plurality of clusters to one or more baseline clusters corresponding to the authorized access of the one or more backend databases;
   determine that a particular cluster of the one or more clusters corresponds to the unauthorized access of the one or more backend databases based on the comparison; and
   responsive to determining that the particular cluster of the one or more clusters corresponds to the unauthorized access of the one or more backend databases, generate, by a display device of the web server, a graphical user interface representing the particular cluster.

16. The web server of claim 15, wherein the instructions further cause the one or more computer processors to:
   receive stored web application activity and stored database activity; and
   generate, by the machine learning algorithm, the one or more baseline clusters, the generating of the one or more baseline clusters comprising segmenting the stored web application activity and stored database activity based on the features.

17. The web server of claim 15, wherein the features comprise a plurality of parameterized SQL database queries generated by the web server, the web application and the web server representing an application tier of the N-tier architecture, the plurality of parameterized SQL database queries generated based on data requested by one or more web requests from at least one of a client web browser or a web service.

18. The web server of claim 15, wherein the segmenting of the web application logs and the database logs into the plurality of clusters comprises determining, by the machine learning algorithm, a contextual correlation of the application logs to the database logs.

19. The web server of claim 15, wherein the instructions further cause the one or more computer processors to:
   receive one or more web requests from at least one of a client web browser or a web service, the at least one of the client web browser or the web service representing a presentation tier of the N-tier architecture; and
   transmit the one or more web requests to a web application executed by the one or more processors.

20. The web server of claim 19, wherein the instructions further cause the one or more computer processors to:
   responsive to receiving the one or more web requests, generate, by the web application, one or more parameterized SQL database queries and the web application logs; and
   transmit the one or more parameterized SQL database queries to one or more backend databases representing a data tier of the N-tier architecture.

* * * * *